123,180

UNITED STATES PATENT OFFICE.

THEODOR KUHN, OF GREENVILLE, NEW JERSEY.

IMPROVEMENT IN MEDICAL COMPOUNDS OR SALVES.

Specification forming part of Letters Patent No. 123,180, dated January 30, 1872.

Specification describing a new and Improved Salve, invented by THEODOR KUHN, of Greenville, in the county of Hudson and State of New Jersey.

This invention relates to a new salve for the cure of boils and eruptions of a non-poisonous character, such as occur on the breasts of females during nursing; also, from rheumatism and other causes. My invention consists in compounding butter, bees-wax, and brandy in such manner as to produce a salve which, externally applied, will cure the disorders referred to.

To eight pounds of butter I use one and a half pound of bees-wax and one and a quarter quarts of brandy, all of the very best quality. The butter and bees-wax are first melted over a fire, and the brandy then added and properly mixed in, and the salve allowed to cool.

The same is then applied externally, like other salves.

It is entirely harmless, but invigorating to the system, the bees-wax being the principal curative, the brandy the strengthening ingredient, and the butter the vehicle.

Having thus described my invention, I claim as new and desire to secure by Letters Patent—

The composition for a salve, as described.

THEODOR KUHN.

Witnesses:
GEO. W. MABEE,
T. B. MOSHER.